(12) United States Patent
West (10) Patent No.: US 11,517,154 B2
(45) Date of Patent: Dec. 6, 2022

(54) TRAY ASSEMBLY FOR A CUTTING BOARD

(71) Applicant: Rennie West, Carson, CA (US)

(72) Inventor: Rennie West, Carson, CA (US)

( * ) Notice: Subject to any disclaimer, the term of this patent is extended or adjusted under 35 U.S.C. 154(b) by 0 days.

(21) Appl. No.: 16/918,261

(22) Filed: Jul. 1, 2020

(65) Prior Publication Data

US 2021/0000302 A1    Jan. 7, 2021

Related U.S. Application Data

(60) Provisional application No. 62/869,950, filed on Jul. 2, 2019.

(51) Int. Cl.
*A47J 47/00* (2006.01)

(52) U.S. Cl.
CPC .................. *A47J 47/005* (2013.01)

(58) Field of Classification Search
CPC .................................................. A47J 47/005
See application file for complete search history.

(56) References Cited

U.S. PATENT DOCUMENTS

| | | | |
|---|---|---|---|
| 157,283 A | 12/1874 | Gurney et al. | |
| 4,653,737 A | 3/1987 | Haskins et al. | |
| 5,363,755 A * | 11/1994 | Liang | A47B 77/02 99/352 |
| 8,286,956 B2 | 10/2012 | Pearl et al. | |
| 8,720,879 B1 * | 5/2014 | Schrimper | A47J 47/00 269/16 |
| D802,379 S | 11/2017 | Raphael | |
| 10,758,087 B1 * | 9/2020 | Infante | A47J 47/005 |
| 2008/0296823 A1 | 12/2008 | Pourounidis et al. | |
| 2015/0076974 A1 * | 3/2015 | Schreiter | A47J 45/02 312/140.4 |

(Continued)

FOREIGN PATENT DOCUMENTS

| | | | | |
|---|---|---|---|---|
| DE | 102006059484 A1 * | 6/2008 | | A47J 47/005 |
| DE | 202016105391 U1 * | 10/2016 | | A47B 77/022 |

(Continued)

OTHER PUBLICATIONS

Machine Translation of DE202016105391U1. Rothschenk, Sascha (Year: 2016).*

(Continued)

*Primary Examiner* — Nirvana Deonauth
(74) *Attorney, Agent, or Firm* — Argus Intellectual Enterprise; Jordan Sworen; Daniel Enea (57) ABSTRACT

A tray assembly for use with an existing cutting board to provide additional storage and space when cooking. The assembly includes at least two adjustable legs that are securable to the cutting board for either raising the cutting board above a surface or suspending the cutting board between two walls, such as a sink. One end of each leg includes a fastener, such as a C-clamp for attaching to the cutting board. The assembly further includes four trays movably secured to a plate. The plate is configured to rest beneath the cutting board when in a raised position. Each tray is positioned along a distinct sidewall of the plate and configured to extend beyond the edges of the cutting board when extended. For additional storage, a divider frame secures to each tray when in the extended position, forming an additional center tray.

19 Claims, 6 Drawing Sheets

(56) References Cited

U.S. PATENT DOCUMENTS

2018/0140141 A1   5/2018  Russell

FOREIGN PATENT DOCUMENTS

| DE | 202016105391 U1 * | 11/2016 | ........... A47B 77/022 |
| KR | 200197497 Y1 | 9/2000 | |

OTHER PUBLICATIONS

Machine Translation of DE-102006059484-A1. Bruening. "Kitchen Utensil has Support Section consisting of a Bottom and Two Side Walls which engage in Slot in Chopping Board so that Chopping Board can be guided on Support Section in Slot in Longitudinal Direction". (Year: 2008).*

* cited by examiner

TRAY ASSEMBLY FOR A CUTTING BOARD

BACKGROUND OF THE INVENTION

The present invention relates to assemblies for cutting boards. The present invention more specifically provides a pair of adjustable legs that secure to a cutting board for raising the cutting board above a surface and a plate having a plurality of trays configured to rest beneath the cutting board when in the raised position.

Cutting boards used to chop vegetables, fruit, meat, and other food items, protect countertop surfaces and provide a clean area for resting food upon. However, the surface area where the cutting board rests becomes a useless storage space or a diminished work zone when in use. The cutting board is a versatile work space at the start of chopping, but its use is greatly diminished as more of the food products are cut up with both desired and unwanted portions, such as inedible portions, skins, peels, and the like. This mass of chopped food prevents further chopping of food stuffs, requiring the cutting board to be cleared in some fashion or an additional cutting board to be placed on another portion of available workspace.

As a solution, some people choose to use receptables, such as bowls or pans, that sit alongside a cutting board to receive discarded or chopped food. The addition of these receptacles to the work counter further reduces the available countertop space in the kitchen, making cooking and prep work even more difficult and cramped.

There remains a need for a cutting board that protects the countertop from damage and food stuffs, but also provides storage for chopped material without further reducing the available kitchen workspace.

The present invention is configured to secure to an existing cutting board and create additional storage space under the cutting board, making chopping much more efficient and expeditious. The assembly includes a plate having four trays removably or movably secured thereto. The plate is configured to rest beneath the cutting board when in a raised position. Each tray is positioned along a distinct sidewall of the plate and configured to extend beyond the edges of the cutting board when extended therefrom. In some embodiments, the first tray is void of a rear wall in order to receive the opposing second tray when in the retracted position. The third and fourth trays oppose one another and are smaller in size than the first and second catch pan in order to fully retract onto the plate. In alternate embodiments, the third and fourth trays are detached from the plate and nested within the first and second trays for storage. Each tray can be used as a waste bin, storage for a type of vegetable or other food waiting to be chopped, storage for chopped food, and the like.

In light of the devices disclosed in the known art, it is submitted that the present invention substantially diverges in design elements and methods from the known art and consequently it is clear that there is a need in the art for an improvement for tray assembly for a cutting board. In this regard the instant invention substantially fulfills these needs.

SUMMARY OF THE INVENTION

In view of the foregoing disadvantages inherent in the known types of tray assemblies for cutting boards now present in the known art, the present invention provides a new tray assembly for a cutting board wherein the same can be utilized for raising an existing cutting board and providing additional storage and space when cooking and preparing food.

In one embodiment of the present invention, the kit comprises at least two adjustable legs that are securable to an existing cutting board for either raising the cutting board above a surface or suspending the cutting board between two walls, such as a sink. One end of each leg includes a fastener, such as a C-clamp for attaching to the cutting board.

It is an objective of the present invention to provide in some embodiments to further include a plate having trays, wherein the plate is configured to rest beneath the cutting board when in a raised position. Each tray is positioned along a distinct sidewall of the plate and configured to extend beyond the edges of the cutting board when extended therefrom. In some embodiments, the first tray is void of a rear wall in order to receive the opposing second tray when in the retracted position. The third and fourth trays oppose one another and are smaller in size than the first and second trays in order to fully retract onto the plate. In some embodiments the trays are removable from the plate and are configured to nest within one another.

It is an objective of the present invention to provide in some embodiments to further include a divider frame configured to secure to each tray when in the extended position, forming an additional center tray, wherein the plate forms a floor thereto.

It is therefore an object of the present invention to provide a new and improved tray assembly for a cutting board that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings.

DETAILED DESCRIPTION OF THE INVENTION

Reference is made herein to the attached drawings. For the purposes of presenting a brief and clear description of the present invention, the preferred embodiment will be discussed as used for raising an existing cutting board and providing additional storage and space when cooking. The figures are intended for representative purposes only and should not be considered to be limiting in any respect.

Figure 1:
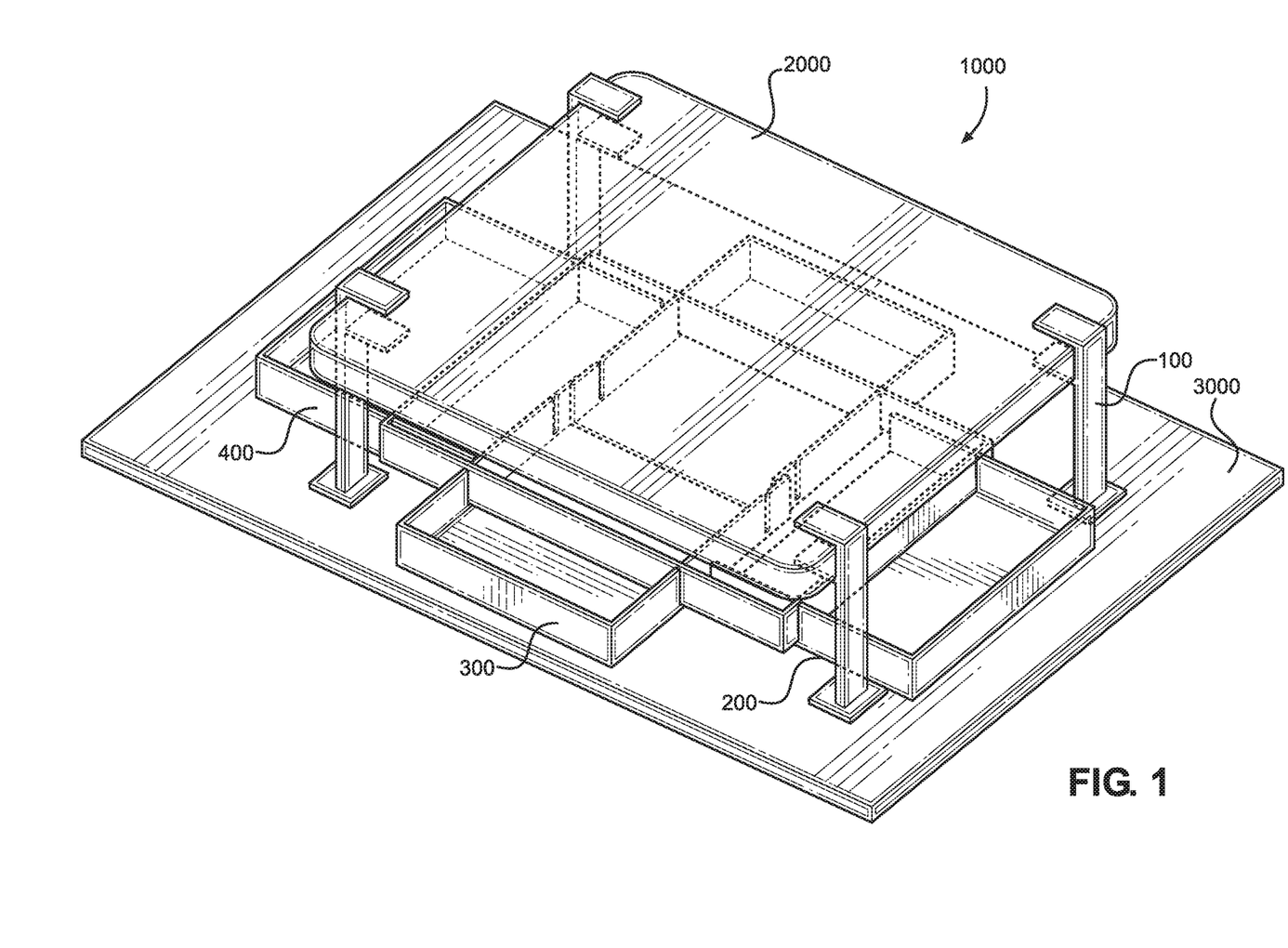
FIG. 1 shows a perspective view of an embodiment of the tray assembly for a cutting board, in use.

Referring now to FIG. 1, there is shown a perspective view of an embodiment of the tray assembly for a cutting board, in use. The tray assembly 1000 comprises one or more legs 100 that are removably securable to an existing cutting board 2000. When secured to the cutting board 2000, the legs 100 elevate the cutting board 2000 above a surface 3000, such as a tabletop, to a raised position. The tray assembly further comprises a plate 200 having a plurality of trays 300 removably affixed thereto. The plate 200 is configured to rest beneath the cutting board 2000 when in the cutting board is in the raised position. Each tray 300 is configured to extend beyond a sidewall of the cutting board 2000 and can be used as a waste bin, storage for a type of vegetable or other food waiting to be chopped, storage for chopped food, and the like. The tray assembly provides additional space for a user when preparing food with a cutting board. After the user has chopped the food, the trays 300 are separated from the plate and the contents therein is either discarded or placed within another receptable such as storage or a pot for cooking. When the cutting board 2000 is no longer needed, the trays 300 are fully retracted or placed onto the plate 200 or completely removed for cleaning. Once the trays 300 are in the retracted position, each tray 300 is configured to receive a leg for storage. In alternate embodiments, the trays 300 are nested within one another and the legs are placed on to plate 200 and adjacent to the nested trays 300. In some embodiments, the assembly includes the cutting board.

Figure 2:
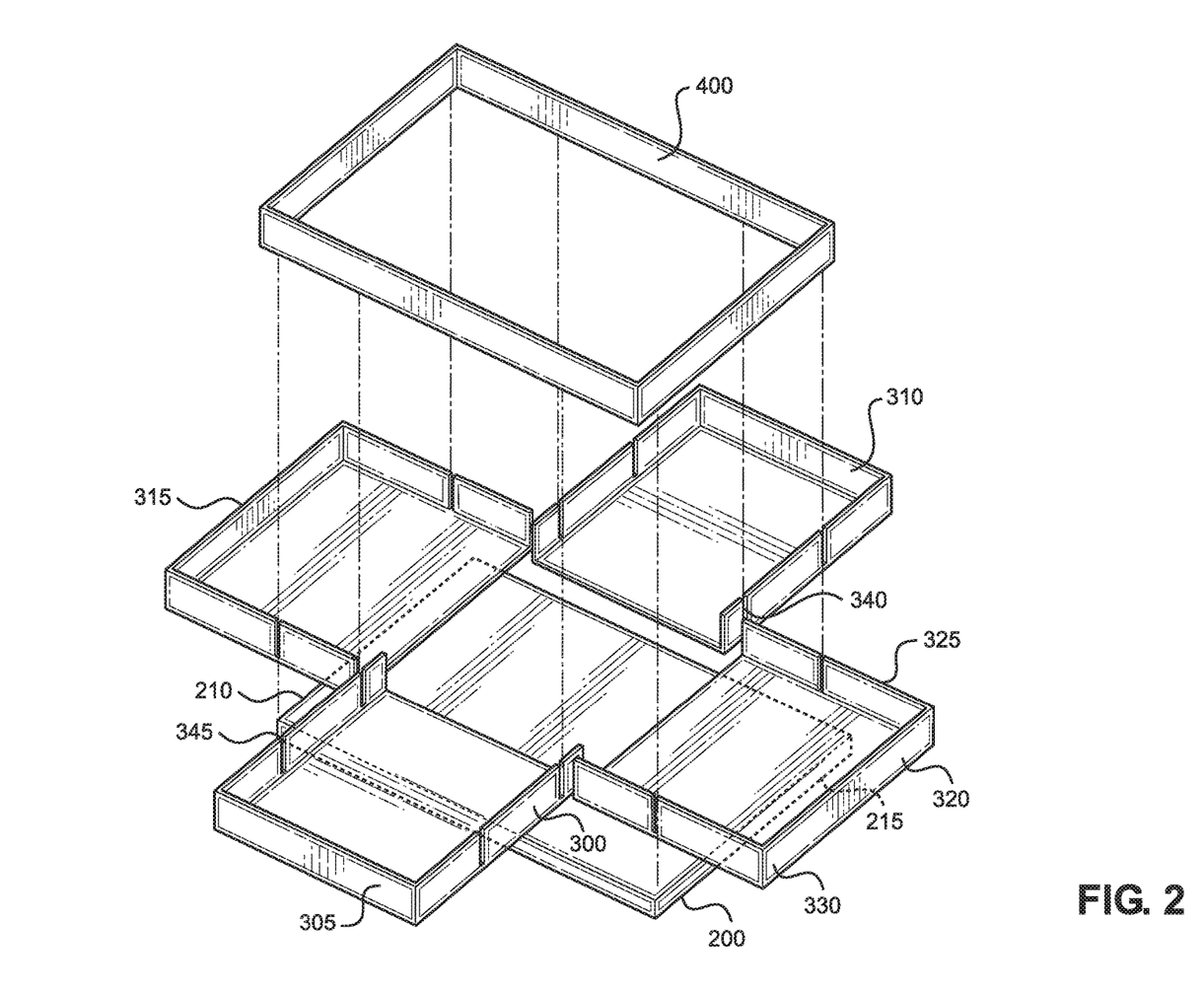
FIG. 2 shows an exploded view of the plate, trays, and the divider frame of an embodiment of the tray assembly for a cutting board.

Referring now to FIG. 2, there is shown an exploded view of the plate, trays, and the divider frame of an embodiment of the tray assembly for a cutting board. In the illustrated embodiment, the plate 200 comprises a rectangular cross section and is flat. Four trays 300 are adapted to extend along a distinct side 210 of the plate 200. In the illustrated embodiment, the plate and trays are rigid, water-resistant, and made of any suitable material, such as plastic. In some embodiments, the plate comprises sidewalls. In alternate embodiments, the plate 200 is any suitable shape that matches the cross section of the cutting board to which it will attach.

In the illustrated embodiment, a first tray 305 opposes a second tray 310 and a third tray 315 opposes a fourth 320. The trays 300 are each configured to retract entirely onto the plate 200 and extend outward therefrom. In the extended position, each tray 300 is configured to extend beyond the edges of the cutting board. In this way, an interior of each tray is accessible when the cutting board is in use. Each tray 300 comprises a rectangle shaped cross section and a floor 335 with a pair of opposing sidewalls 325 extending therefrom and a front wall 330. The sidewalls 325 and front wall 330 are configured to prevent food items from falling therefrom during transport.

In the illustrated embodiment, the first tray 305 is void of a rear wall in order to receive the opposing second tray when in the retracted position. In some embodiments, the second tray 310 comprises a rear wall and in other embodiments is also void of a rear wall. The third and fourth trays oppose one another and are smaller in size than the first and second trays in order to fully retract onto the plate 200. This configuration of the trays allows for compact storage of the tray assembly is not in use.

The trays 300 are separable from the plate 200 in order to allow a user to conveniently transport the contents of the tray to another area without having to carry the entire plate. For example, if a tray 300 is full of discarded food, a user can carry the tray to a trash in order to dispose of the contents, or if another tray is full of chopped food, the user can carry the tray to a pot or pan on the stove for cooking. The trays 300 are securable to the plate 200 via any suitable fastener, such as hook and loop fastener or interlocking components configured to maintain a lower of the tray 300 surface flush against an upper surface of the plate 200.

In some embodiments, the tray assembly comprises a divider frame 400 configured to further secure the trays 300 to the plate 200 and form an additional center tray or fifth tray (as seen in FIG. 1) when the trays are in the extended position. The divider frame 400 comprises four sidewalls forming a rectangular cross section. The frame 400 is void of a floor, wherein an upper surface of the plate 300 forms the floor of the center tray. The divider frame is used to create additional space within the plate 300. In some embodiments, the divider frame 400 comprises a same length and width of the plate.

In order to secure the divider frame 400 to the trays, each tray comprises a pair of first slots 340 positioned adjacent to a rear side of the trays 300. In the extended position, the first slots 340 are aligned with the perimeter 215 of the plate 300 (as seen in FIG. 1). In the illustrated embodiment, the first slots 340 extend along an entire length of the sidewall of the tray and terminate at the floor of the tray 300. In alternate embodiments, the divider frame comprises the first slots configured to align with and receive a sidewall of each tray. In the illustrated embodiment, the trays 300 are configured to receive the divider frame in the extended position such that an uppermost surface of the trays are aligned with an uppermost surface of the divider frame, forming a level surface therebetween. When the tray assembly is not in use, the divider wall 400 is removed from the first slots and the trays are retracted onto the plate 200. The divider wall 400 is then repositioned around the perimeter of the plate. In some embodiments, the perimeter of the plate comprises a groove 230 disposed therearound for receiving the divider wall 400 and preventing movement when the tray assembly is in the stored position (as seen in FIG. 3B).

Figure 3A:
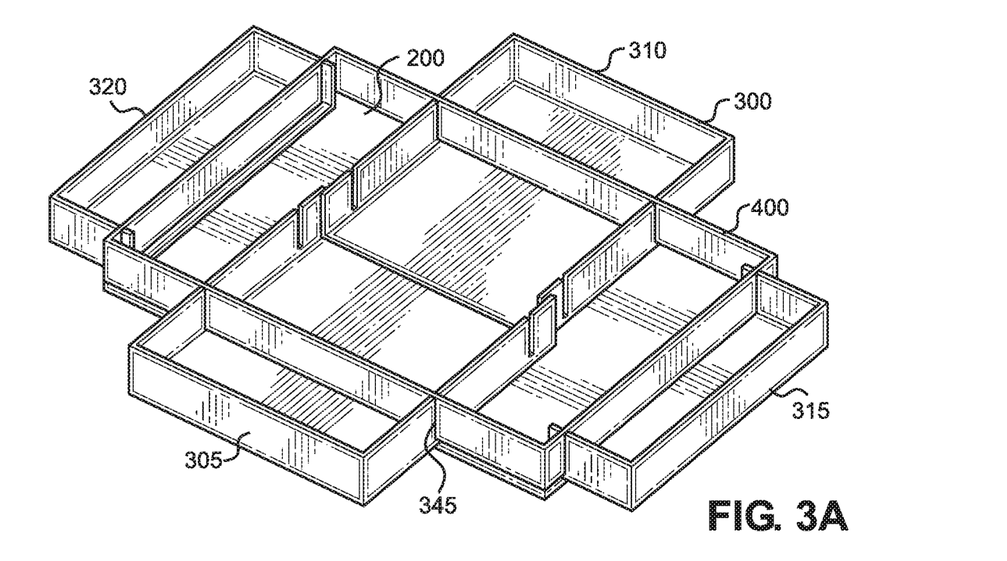
FIG. 3A shows a perspective view of the first and second tray of the tray assembly in a semi-stored position.
Figure 3B:
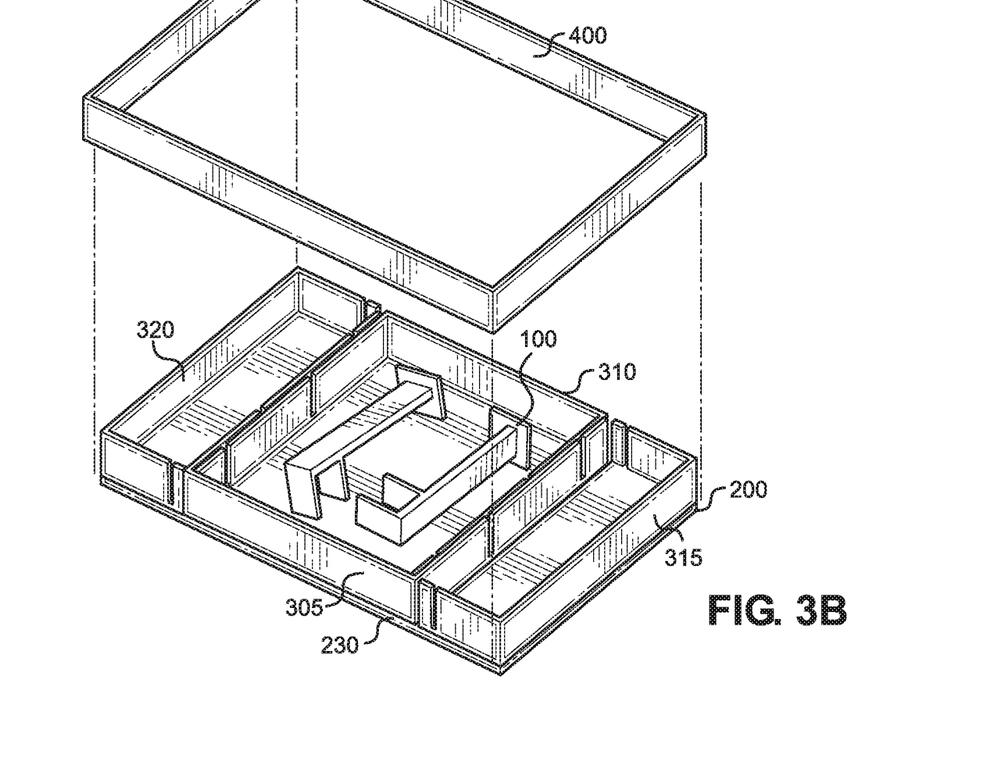
FIG. 3B shows a perspective view of the trays retracted onto the plate of the tray assembly in a stored position.
Figure 4:
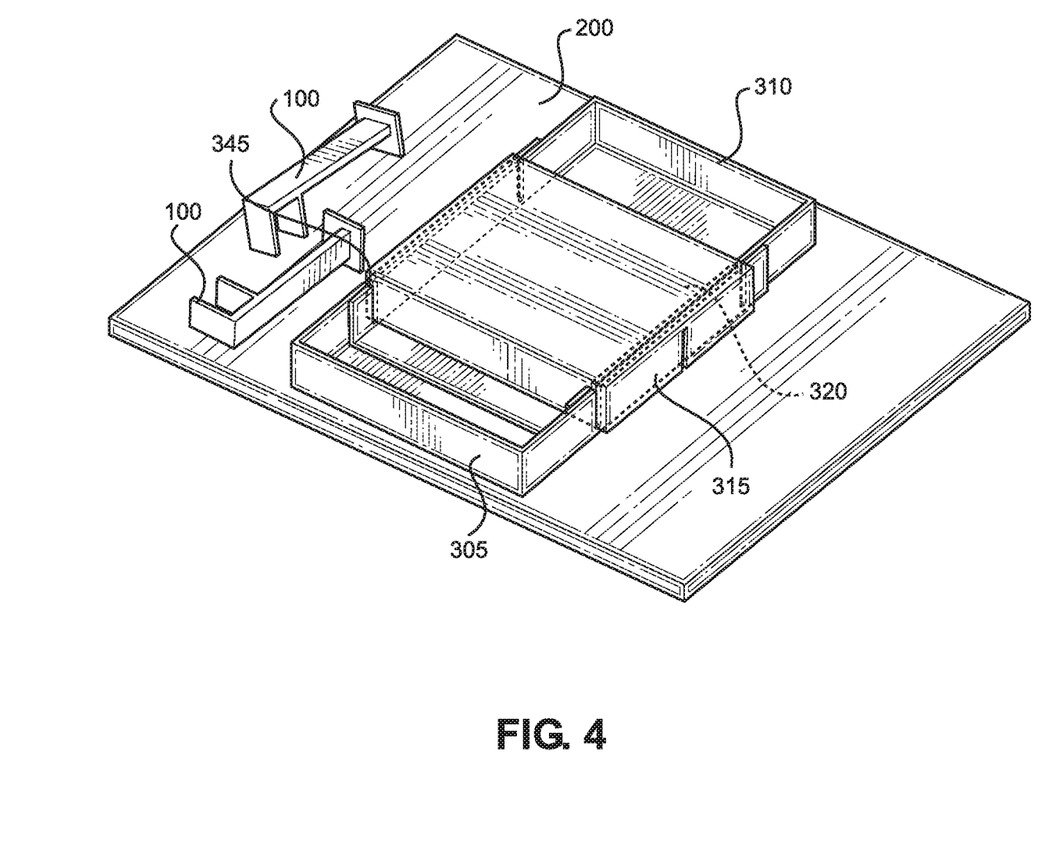
FIG. 4 shows a perspective view of the trays of the tray assembly in a second stored configuration.

Referring now to FIGS. 3A and 3B, there are shown perspective views of the first and second tray of the tray assembly in a semi-stored position and a stored position, respectively. In some embodiments, the first and second trays 305, 310 each comprise a pair of second slots disposed on opposing sidewalls thereof. The second slots 345 are disposed adjacent to the front side of each tray 300 configured to receive the divider frame 400 therein. The second slots 345 allow a user to adjust how far the first and second trays 300 extend from the plate 200. Further, the second slot 345 are configured to receive the third and fourth trays 315, 320 in a stack configuration, as shown in FIG. 4. When the trays are in the extended or semi-extended as shown, an end portion of the tray disposed on the other side of the first slot, remains on the upper surface of the plate 200. In the shown embodiment, the fastener securing each tray to the plate extends along the end portion of tray and plate.

In the illustrated embodiment, the first tray 305 is wider than the second tray 310 in order to receive the second tray 310 therein. In the stored position as shown in FIG. 3B, the second tray 310 is entirely disposed within the first tray 305, wherein the lower surface of the trays fit entirely onto the plate 200. The third and fourth trays 315, 320 also fit entirely onto the plate 200, wherein a rear side of each tray abuts a sidewall of the first tray 305. The divider frame 400 is positioned around the stored trays and, in some embodiments, rests within the groove 230 of the plate 200. The legs are configured to be disposed within the second tray 310 or/and within the third and fourth trays.

Referring now to FIG. 4, there is shown a perspective view of the trays of the tray assembly in a second stored configuration. In some embodiments, the third and fourth trays 315, 320 comprise a same length as the first and second trays 305, 310 such that the plate is not large enough to receive the third and fourth trays directly on the upper surface thereof a stored configuration. In this embodiment, the third tray 315 is wider than the fourth tray 320 such that the fourth tray is configured to be received within the third tray. Once the fourth tray is disposed within the third tray, the trays are flipped over and onto the first and second trays as shown. The second slots 345 receive a respective sidewall of the third and fourth trays. In this way, the opposing void sides of the plate are configured to receive the legs 100 in the stored position.

Figure 5:
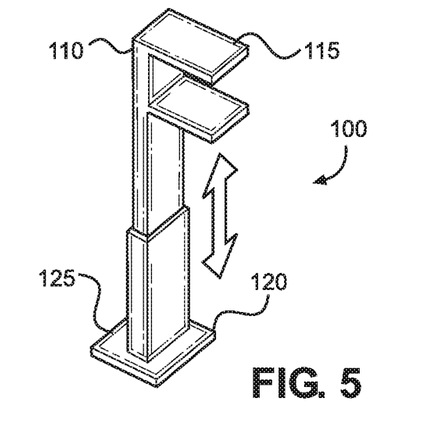
FIG. 5 shows a perspective view of a leg of the tray assembly for a cutting board.

Referring now to FIG. 5, there is shown a perspective view of a leg of the tray assembly for a cutting board. In some embodiments, each leg 100 is adjustable in height in order to allow a user to selectively adjust the distance of the cutting board from above the surface. Any suitable adjustment mechanism is used to adjust the height of each leg, such as a telescoping leg. In the illustrated embodiment, the tray assembly includes four legs 100 each configured to secure to a side of the cutting board. In the illustrated embodiment, each leg 100 is rigid and made of any suitable material, such as plastic or metal.

A fastener is disposed on a first end 110 of each leg 100 for removably securing to the cutting board. In the illustrated embodiment, the fastener is a C-clamp 115 having a pair of jaws that forming a channel dimensioned to receive a thickness of the cutting board therein. In an alternative embodiment, the jaws of the C-clamp are adjustable to fit cutting boards having varying widths. However, in alternate embodiments, any suitable fastener is used capable of removably securing to the cutting board, such as a friction fit or a temporary adhesive.

A base 120 is disposed on a second end 125 of each leg 100 for supporting the cutting board is the raised position. In the illustrated embodiment, the base 120 comprises a flat lower surface, such that a leg portion extends perpendicularly therefrom. However, in alternate embodiments, the base 120 is any suitable structure for supporting the cutting board in a raised position. In some embodiments, the base comprises suction cups for allowing the legs to secure between sidewalls of a sink or have a more secure securement to a countertop surface. In some embodiments, the base includes a non-slip layer in order to prevent the legs from moving when the cutting board is in use and the surface may become wet. In some embodiments, the fastener and base are pivotally secured to the leg so as to allow the positioning of the leg to be easily adjusted, such as between a perpendicular position or parallel position relative to the cutting board when attached thereto.

Figure 6A:
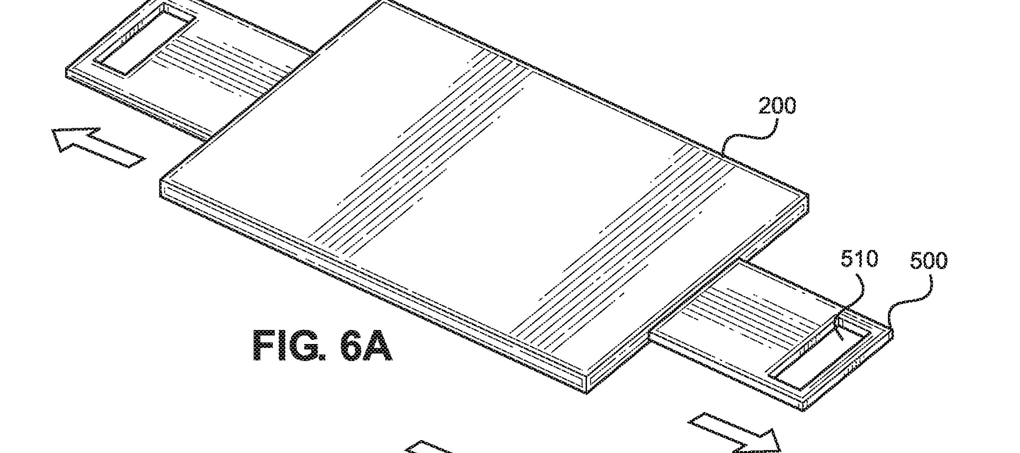
FIG. 6A shows a perspective view of a rear side of the plate of the tray assembly for a cutting board, wherein the handles are extended.
Figure 6B:
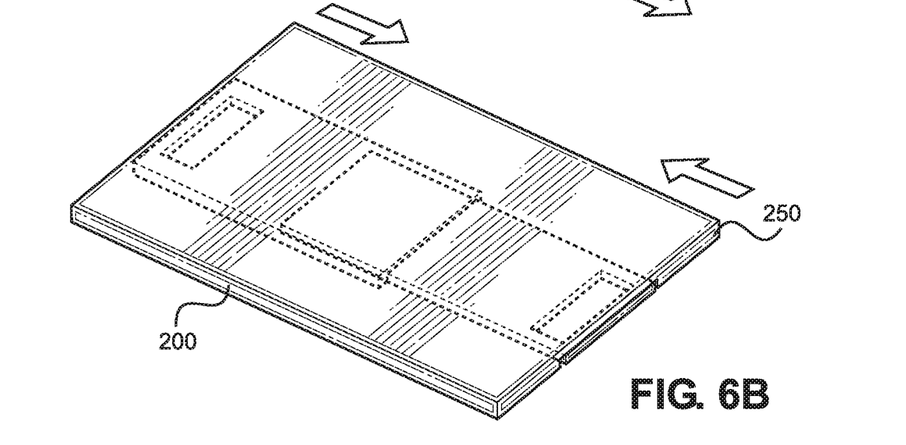
FIG. 6B shows a perspective view of a rear side of the plate of the tray assembly for a cutting board, wherein the handles are retracted.

Referring now to FIGS. 6A and 6B, there are shown perspective views of a rear side of the plate of the tray assembly for a cutting board, wherein the handles are extended and retracted, respectively. In some embodiments, handles 500 are retractably secured to the plate 200. In the shown embodiment, the handles 500 are retractably stored within an interior volume of the plate 200. However, in alternate embodiments, the handles 500 are secured to an exterior side of the plate 200. In the illustrated embodiment, the plate comprises a flat channel extending through the interior volume that receives the handles 500s. The channel extends from opposing sides 250 of the plate 200. Each handle 500 comprises a hand aperture and a similar cross section to the flat channel. The handle allows a user to transport the trays and the plate between locations, instead of having to individually separate and transport each tray. If a user no longer needs to transport multiple trays simultaneously, the handles 500 are retracted into the plate 200.

Figure 7A:
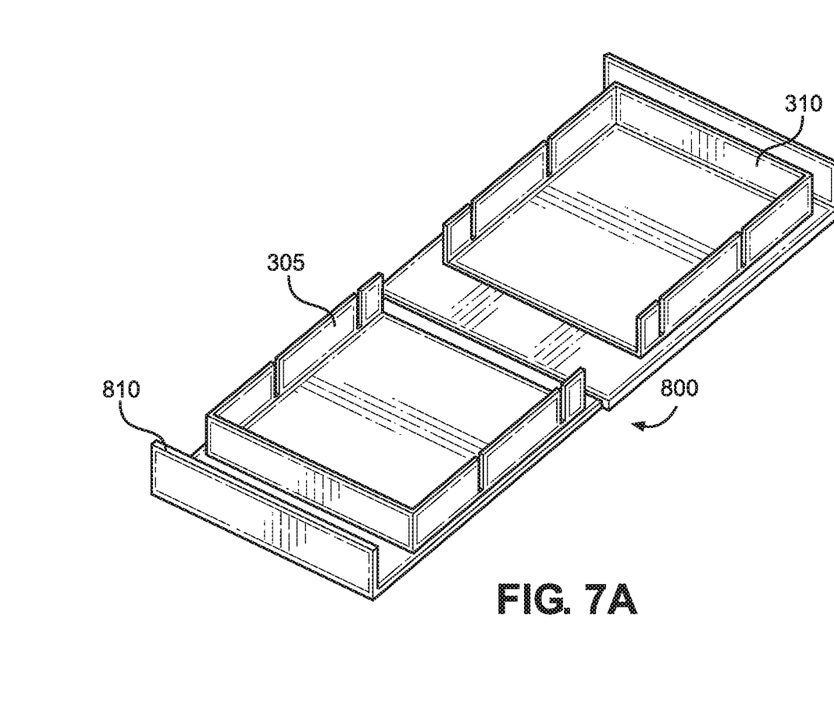
FIG. 7A shows a perspective view of a retractable plate of the tray assembly for a cutting board, wherein the retractable plate is in an extended position.
Figure 7B:
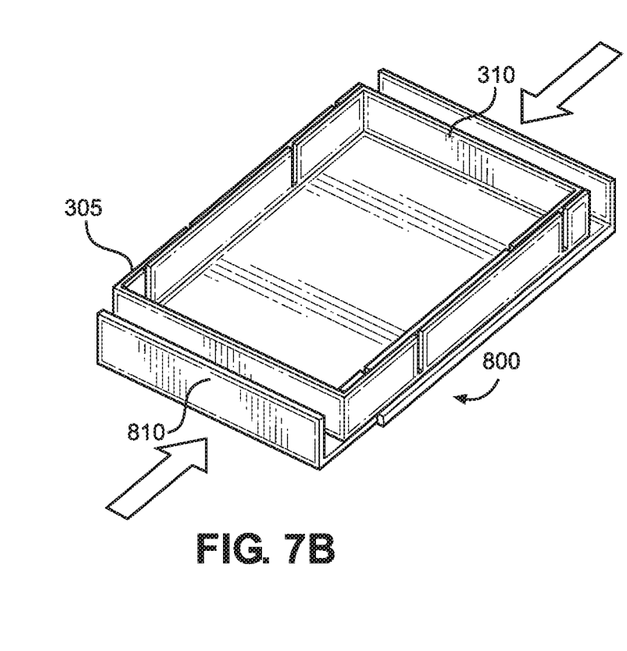
FIG. 7B shows a perspective view of a retractable plate of the tray assembly for a cutting board, wherein the retractable plate is in a retracted position.

Referring now to FIGS. 7A and 7B, there are shown perspective views of a retractable plate of the tray assembly for a cutting board, wherein the retractable plate is in an extended position and a retracted position, respectively. In some embodiments, the trays 305, 310 rest on a retractable plate 800. The retractable plate 800 comprises a first side that slides beneath or otherwise retracts into a second side. The retractable plate 800 is substantially planar in order to receive the trays thereon. In the illustrated embodiment, each side of the retractable plate 800 comprises a sidewall 810 extending from a terminal end thereof. The sidewall 810 allows the retractable plate 800 to retain the trays thereon and provide a grasping area for a user to move the retractable plate between an extended and retracted position. In the extended position, the trays are separated from on another, whereas in the retracted position, the plates are nested into one another. In the illustrated embodiments, the retractable plate is rectangular in shape and comprises a width similar to the width of the trays. The length of the first side and second side of the retractable tray allows the trays to separate and extend beyond an edge of the cutting board in the raised position and when the retractable plate is disposed therebeneath.

In operation, a user secures the first end of each leg to the edge of a cutting board. Each leg is positioned equidistance from one another along the cutting board in order to evenly distribute the weight of the cutting board thereon to provide stability. The height of each leg is adjusted to the preference of the user for utilizing the cutting board. The plate is positioned beneath the raised cutting board and the trays are fully extended. In some embodiments, the tray is secured to the cutting board to prevent any movement thereof. The tray is secured to the cutting board via any suitable fastener, such as a clip. When the cutting board is no longer needed, the trays are fully retracted onto the plate or completely removed for cleaning.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tray assembly for a cutting board, comprising:
one or more legs each having a fastener disposed on a first end thereof, wherein the fastener is adapted to removably secure to the cutting board and raise the cutting board from a tabletop in a raised position;
a plurality of trays and a divider frame configured to cooperatively join each of the plurality of trays in an extended position;
wherein each of the plurality of trays is disposed along a corresponding and distinct sidewall of the divider frame and configured to extend beyond an edge of the cutting board in the raised position and when the divider frame is disposed therebeneath;
wherein the plurality of trays includes a first tray opposite a second tray and a third tray opposite a fourth tray;
wherein the first tray is void of a rear wall and adapted to receive the second tray when in a retracted position.

2. The tray assembly of claim 1, wherein the plurality of trays are removably affixed to a plate, wherein the plate is configured to rest beneath the cutting board when in the raised position.

3. The tray assembly of claim 1, wherein the divider frame is adapted to secure simultaneously to a first pair of slots of each of the plurality of trays in an extended position, wherein the first pair of slots of each of the plurality of trays are disposed on lateral sidewalls thereof, and wherein each of the first pair of slots are aligned so as to receive a sidewall of the divider frame.

4. The tray assembly of claim 3, wherein each of the plurality of trays further comprises a second pair of slots positioned distally along each lateral sidewall thereof, wherein the tray assembly is in a semi-stored position when the divider frame is secured within the second pair of slots.

5. The tray assembly of claim 1, wherein the fastener comprises a C-clamp having a pair of adjustable jaws forming a channel sized to receive a height of the cutting board such that the C-clamp sandwiches an upper and lower side of the cutting board between the pair of jaws.

6. The tray assembly of claim 1, wherein the third tray and the fourth tray each comprise a smaller length than a length of the first and second tray, such that the first, second, third, and fourth tray all fit within an interior volume of the divider frame in a stored configuration.

7. The tray assembly of claim 2, wherein the divider frame comprises a sidewall that cooperatively forms an additional tray with an upper side of the plate, wherein the additional tray is disposed between all of the plurality of trays when in the extended position.

8. The tray assembly of claim 1, wherein an uppermost surface of the plurality of trays are aligned with an uppermost surface of the divider frame, forming a level surface therebetween.

9. The tray assembly of claim 2, wherein the plate is retractable and comprises a first side configured to receive the first tray thereon and a second side configured to receive the second tray thereon, the first side is retractable within the second side such that the first tray is nested within the second tray in a retracted position.

10. The tray assembly of claim 2, further comprising a pair of handles that extend from opposing sides of the plate and are configured to support the tray assembly during transport.

11. The tray assembly of claim 10, wherein the plate comprises a channel in an interior volume and the handles retractably disposed within the channel.

12. A tray assembly for a cutting board, comprising:
one or more legs each having a fastener disposed on a first end thereof, wherein the fastener is adapted to removably secure to the cutting board and raise the cutting board from a tabletop in a raised position;
a plate having a plurality of trays removably affixed thereto;
wherein the plate is configured to rest beneath the cutting board when in the raised position;
wherein each of the plurality of trays is disposed along a corresponding and distinct sidewall of the plate and configured to extend beyond an edge of the cutting board in the raised position and when the plate is disposed therebeneath;
a divider frame adapted to secure simultaneously to a first pair of slots of each of the plurality of trays in an extended position, wherein the first pair of slots of each of the plurality of trays are disposed on lateral sidewalls thereof, and wherein each pair of slots are aligned so as to receive a sidewall of the divider frame;
wherein the divider frame cooperatively joins each of the plurality of trays in the extended position;
wherein the plurality of trays includes a first tray opposite a second tray and a third tray opposite a fourth tray.

13. The tray assembly of claim 12, wherein each tray further comprises a second pair of slots positioned distally along each lateral sidewall thereof, wherein the tray assembly is in a semi-stored position when the divider frame is secured within the second pair of slots.

14. The tray assembly of claim 13, wherein the first tray is void of a rear wall and adapted to receive the second tray when in a retracted position;
wherein each of the pair of first slots align with each of the pair of second slots of the first tray and second tray when in the retracted position;
wherein the third tray and the fourth tray are adapted to be inverted such that the lateral sidewall of each the third and the fourth tray are positioned into aligned slots of the first tray and second tray forming a first stored position, wherein the first tray and the second tray are retracted onto the plate.

15. The tray assembly of claim 12, wherein the fastener comprises a C-clamp having a pair of adjustable jaws forming a channel sized to receive a height of the cutting board such that the C-clamp sandwiches an upper and lower side of the cutting board between the pair of jaws.

16. The tray assembly of claim 12, wherein the first tray is void of a rear wall and adapted to receive the second tray when in a retracted position, wherein the third tray and the fourth tray each comprise a smaller length than a length of the first and second tray, such that the first, second, third, and fourth plate all fit onto the plate in a stored configuration.

17. The tray assembly of claim 12, further comprising the cutting board.

18. A tray assembly for a cutting board, comprising:
one or more legs each having a fastener disposed on a first end thereof, wherein the fastener is adapted to removably secure to the cutting board and raise the cutting board from a tabletop in a raised position;

a plurality of trays and a divider frame configured to cooperatively join each of the plurality of trays in an extended position;

wherein each of the plurality of trays is disposed along a corresponding and distinct sidewall of the divider frame and configured to extend beyond an edge of the cutting board in the raised position and when the divider frame is disposed therebeneath;

wherein the divider frame is adapted to secure simultaneously to a first pair of slots of each of the plurality of trays in an extended position, wherein the first pair of slots of each of the plurality of trays are disposed on lateral sidewalls thereof, and wherein each of the first pair of slots are aligned so as to receive a sidewall of the divider frame.

19. A tray assembly for a cutting board, comprising:

one or more legs each having a fastener disposed on a first end thereof, wherein the fastener is adapted to removably secure to the cutting board and raise the cutting board from a tabletop in a raised position;

a plurality of trays and a divider frame configured to cooperatively join each of the plurality of trays in an extended position;

wherein each of the plurality of trays is disposed along a corresponding and distinct sidewall of the divider frame and configured to extend beyond an edge of the cutting board in the raised position and when the divider frame is disposed therebeneath;

wherein the plurality of trays includes a first tray opposite a second tray and a third tray opposite a fourth tray;

wherein the third tray and the fourth tray each comprise a smaller length than a length of the first and second tray, such that the first, second, third, and fourth tray all fit within an interior volume of the divider frame in a stored configuration.

\* \* \* \* \*